Oct. 9, 1951

I. PATRICK 2,570,849

LATCH OPERATED CLUTCH AND CONTROL

Filed June 10, 1948

Inventor

Isaac Patrick

By *Clarence A. O'Brien and Harvey B. Jacobson*

Attorneys

Oct. 9, 1951  I. PATRICK  2,570,849
LATCH OPERATED CLUTCH AND CONTROL
Filed June 10, 1948  5 Sheets-Sheet 2
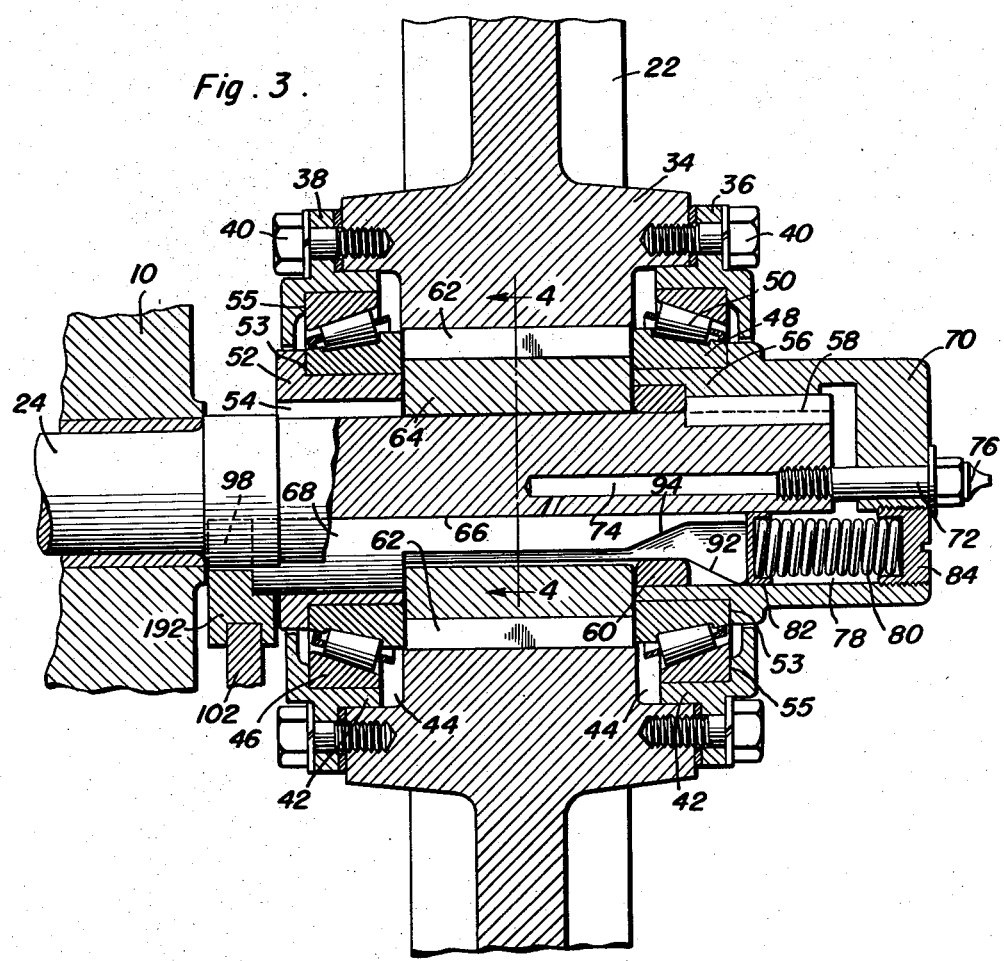
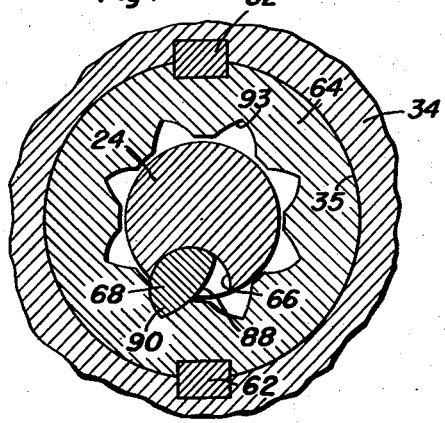
Inventor
Isaac Patrick Oct. 9, 1951           I. PATRICK           2,570,849
LATCH OPERATED CLUTCH AND CONTROL
Filed June 10, 1948           5 Sheets-Sheet 3
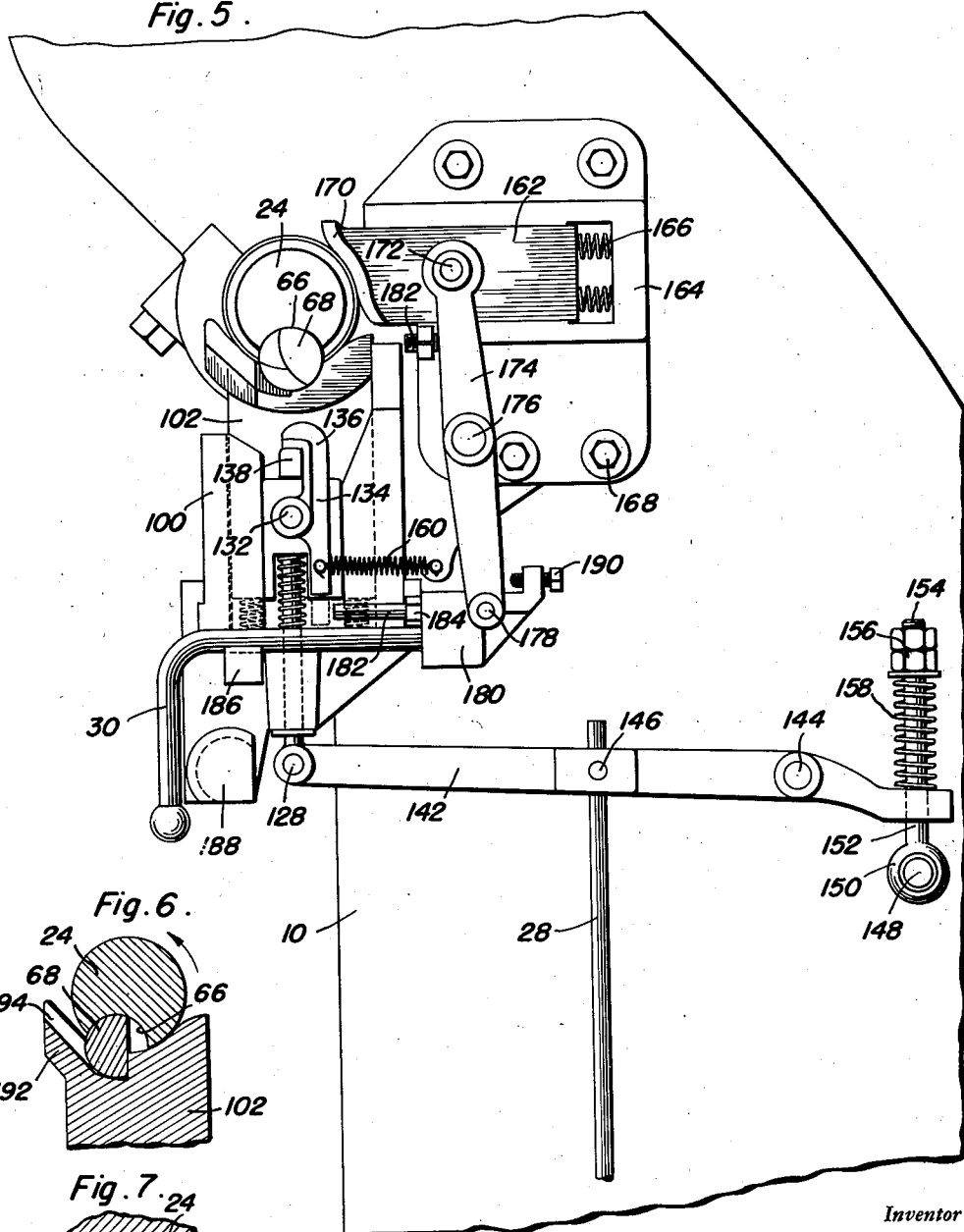
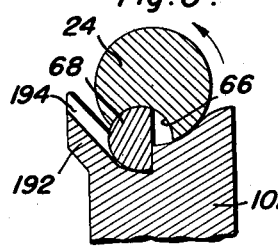
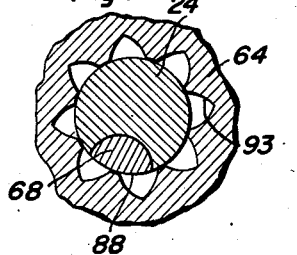
Inventor
Isaac Patrick
By *Clarence A. O'Brien and Harvey B. Jacobson*
Attorneys

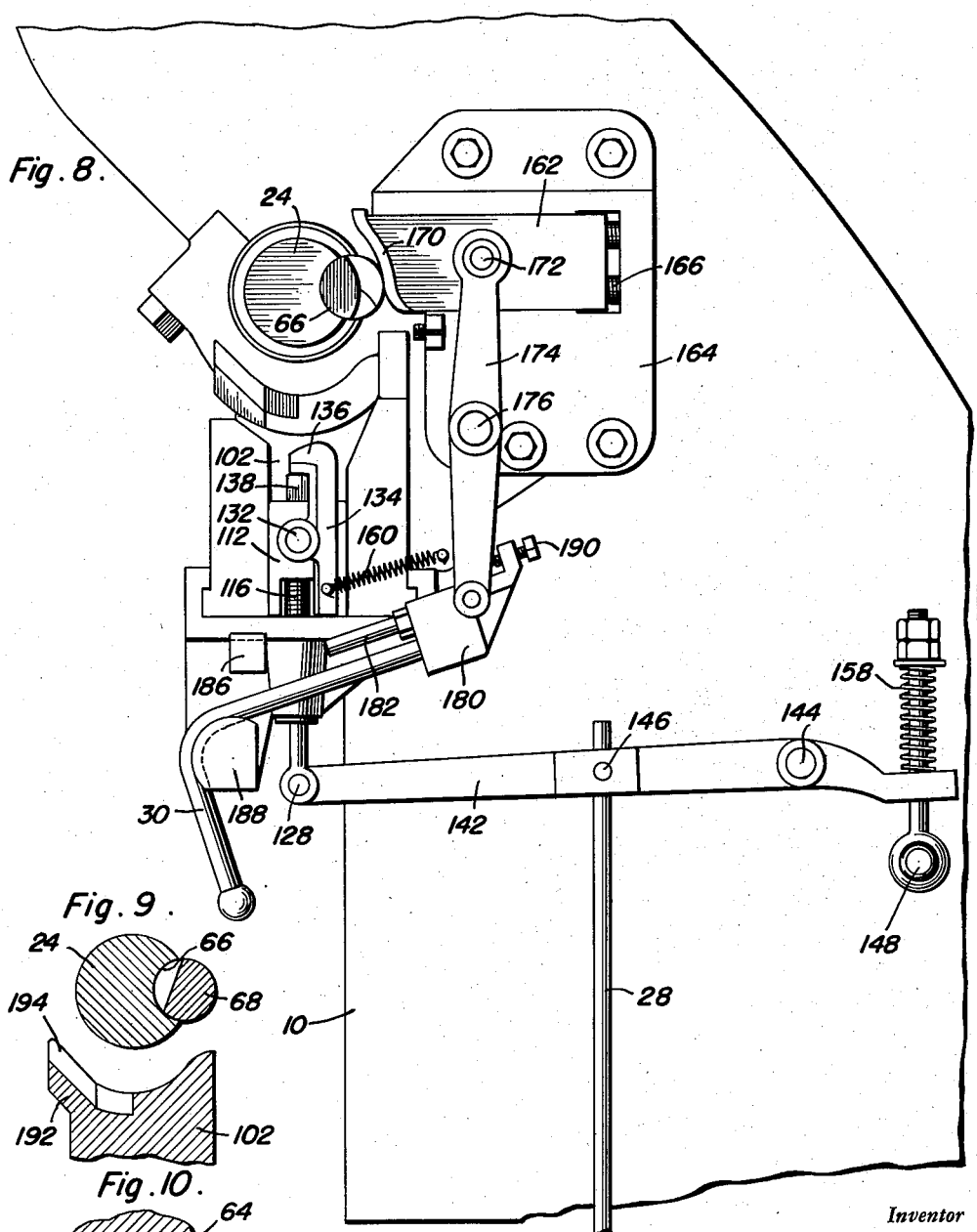

Oct. 9, 1951          I. PATRICK          2,570,849
LATCH OPERATED CLUTCH AND CONTROL
Filed June 10, 1948          5 Sheets-Sheet 5

Inventor
Isaac Patrick
By Clarence A. O'Brien
and Harvey B. Jacobson
Attorneys

Patented Oct. 9, 1951

2,570,849

UNITED STATES PATENT OFFICE 2,570,849

LATCH OPERATED CLUTCH AND CONTROL

Isaac Patrick, Frederick, Md., assignor to Frederick Iron & Steel, Inc., Frederick, Md., a corporation of Maryland Application June 10, 1948, Serial No. 32,177

7 Claims. (Cl. 192—29)

This invention comprises novel and useful improvements in a clutch and clutch control mechanism for inclinable presses, and more specifically pertains to a rolling key type of clutch for operating a press from its power source, together with manually operable means for automatically moving the key into and out of operating position during the operation of the press.

The principal object of this invention is to provide an improved clutch particularly adapted for transmitting power to inclinable presses and having improved operating characteristics including exceptionally sturdy construction and long life, accompanied by ease of actuation and control.

A very important object of the invention is to provide a control mechanism for a clutch of the nature set forth in the preceding object, which is capable of easily and quickly engaging or disengaging the clutch constituting a part of the driving mechanism of a press, and wherein the control mechanism is automatically capable of engaging the clutch selectively for a single operation of the press or for continuous operation thereof.

A still further important object of the invention is to provide a clutch and clutch control mechanism as set forth in the foregoing objects wherein the automatic mechanism may be manually adjusted during operation of the press for adapting the clutch for a single operation or for continuous operation of the press under the control of the manual operating control of the press.

An important feature of the invention resides in the provision of a rolling key type of clutch for establishing a driving engagement between the press ram and the press power shaft with a minimum of lost motion, a maximum of clutch key surface for transmitting the torque, and wherein the key may be moved into and out of operative position with a minimum of effort and delay.

A further important feature of the invention resides in the provision of a clutch control mechanism as set forth in the foregoing feature wherein resilient means are provided on one end of the key for normally biasing the key into clutch-engaging position, and wherein the release mechanism engages the key at its other extremity and is automatically actuated for disengaging the key from its driving engagement in order to selectively condition the clutch mechanism for a single or continuous operation of the press.

A still further feature of the invention resides in the provision of a clutch control mechanism as set forth in the above mentioned features and objects of the invention wherein the power shaft of the press constituting the driven member is encircled by the hub of a flywheel constituting a driving member and wherein a rolling key is seated in a recess in one of the adjacent surfaces of the driving and driven members and is slidable and rotatable therein for radially protruding the convex surface of the key into engaging and driving relation with the other of the two members, and wherein the selective extension and retraction of the key is positively effected and automatically controlled by a highly selective automatic control mechanism.

Yet another feature of the invention resides in the provision of a clutch control mechanism conforming to the foregoing objects and features, wherein the rotation of the clutch key with its seating member is employed to effect the automatic disengagement of the key from its driving engagement in accordance with the automatic control linkage of the mechanism, and wherein there is provided an additional mechanism which is directly operable by the clutch key during rotation of the latter with its seating shaft, for causing actuation of the release mechanism once each revolution of the clutch shaft when the selector mechanism is in the one stroke position.

An additional feature of the invention resides in the provision of a clutch control mechanism, as set forth hereinbefore, wherein automatic means are provided for intermittently engaging the clutch and connecting a constantly rotating power shaft to the reciprocating ram of a press for effecting predetermined single strokes or continuous strokes of the ram under the control of an automatic means.

An additional and still further feature of the invention resides in the provision of a clutch control mechanism wherein manual operation of a control lever is operable for positioning and withdrawing a latch whereby the clutch key is free to rotate in its clutch engaging position; together with a one stroke, release plunger engageable by the key during each revolution of the power shaft of the clutch for releasing the latch to enable the latter to disengage the key after one revolution of the clutch power shaft; and further provided with selector means for rendering the one stroke mechanism inoperative to release the latch; and further provided with a latch hook mechanism which is operable by the one stroke mechanism for releasing the latch, and after such operation automatically re-engages the latch upon release of the manual control lever of the press.

These, together with various ancillary features and objects of the invention which will later become apparent as the following description proceeds, are attained by this device, the preferred embodiment of which has been illustrated, by way of example only, in the accompanying drawings, wherein:

Figure 3 is a fragmentary transverse sectional detail view upon an enlarged scale substantially upon the vertical plane of the section line 3—3 of Figure 1 showing the clutch construction with the clutch key in disengaged position therein;

Figure 4 is a fragmentary transverse sectional detail view taken substantially upon the vertical plane of the section line 4—4 of Figure 3, the clutch being in a different position of adjustment, with the clutch key shown in the engaged position rather than in the disengaged position of Figure 3;

Figure 5 is a fragmentary side elevational view of the clutch control mechanism, the selector device being shown in the one-stroke position of the automatic clutch control mechanism;

Figure 6 is a fragmentary detail view taken in vertical section through the clutch key and latch mechanism, showing the position of the parts when the clutch key is engaged with the latch prior to returning the clutch to its neutral or inoperative position;

Figure 7 is a fragmentary vertical sectional detail view taken substantially upon the plane of the section line 4—4 of Figure 3, but showing the position of the clutch key when the latter is in its neutral or inoperative position;

Figure 8 is a fragmentary side elevational view similar to Figure 5 but showing the position of the parts when the selector mechanism is in the continuous stroke position, the clutch control treadle being depressed to permit automatic operation of the press;

Figure 9 is a view similar to Figure 6 but illustrating the position of the clutch after the treadle has withdrawn the latch, the clutch is engaged, and rotation of the press power shaft has started;

Figure 10 is a view similar to Figure 7, but showing the clutch key fully engaged, the clutch parts being in the same position indicated in Figure 9;

Figure 1:
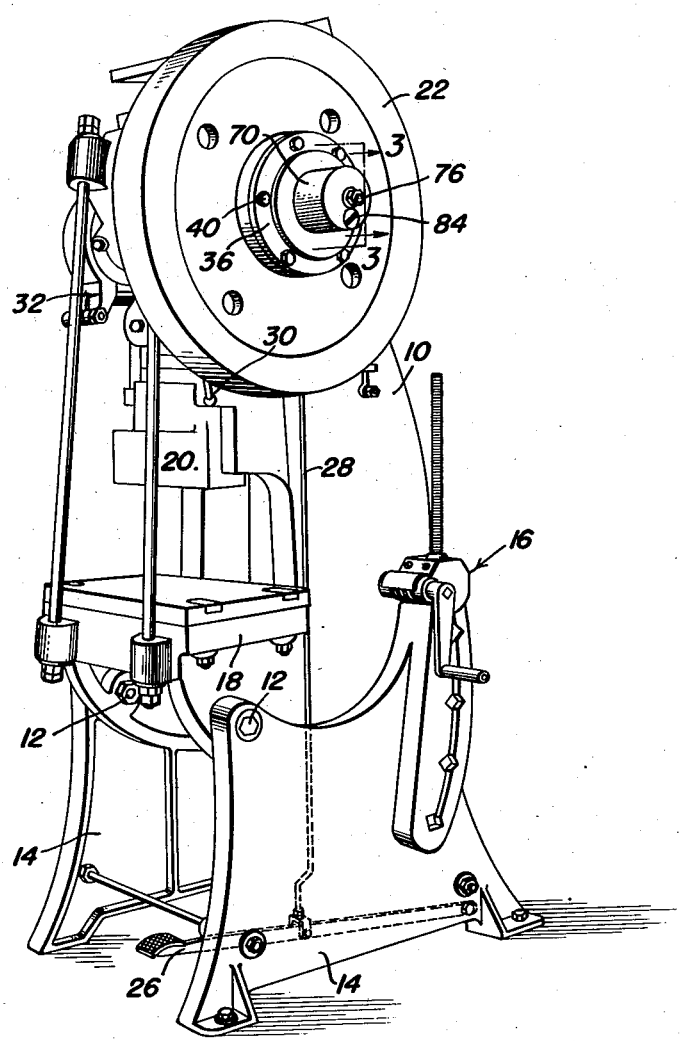
Figure 1 is a perspective view of an inclinable press with which the present invention is associated.

Referring now more specifically to the accompanying drawings, wherein like numerals designate similar parts throughout the various views, attention is directed primarily to Figure 1 wherein there is disclosed a construction of inclinable press with which the clutch and clutch control mechanism forming the subject of this invention is particularly adapted. Construction of the inclinable press and its inclination-adjusting mechanism does not, in itself, form any part of the invention claimed in this application, being set forth more particularly and claimed in my co-pending application, Ser. No. 24,737, filed May 3, 1948, for Inclinable Press.

Represented generally by the numeral 10 is the body portion of the inclinable press, which body portion is pivoted, as by pins 12, to a pair of standards 14 forming a supporting base for the press, the body 10 being inclinable about the pivot pins 12 in order to position the body and its associated elements at various degrees of inclination as desired, this inclining movement being controlled and effected by an inclining mechanism designated generally by the numeral 16, and whose construction and operation is set forth more particularly in my above identified application.

The body 10 includes a press bed 18 adapted to support any desired dies, or articles to be operated upon by the press, and which cooperates with the press ram 20 carrying any suitable tools or articles to be worked upon, which ram is reciprocable in guideways formed in the body 10 and is operated through any suitable type of connecting means from the power-supplying means of the press.

This means includes a flywheel 22 to which power is applied from any suitable external source and in any suitable manner, not shown, which flywheel, as shown clearly in Figure 3, is rotatably journaled upon a shaft 24, which in turn is suitably journaled in the body 10 of the press and is connected to the press ram 20. The power shaft 24, which is hereinafter referred to as the driven shaft, is of any suitable type and construction, but is preferably extended beyond one side of the body 10 to rotatably receive the flywheel 22 thereon.

As will be best seen in Figure 1, a manual clutch-operating means, such as the treadle 26 suitably pivoted to one of the standards 14 of the supporting base, is pivotally engaged with the clutch operating rod 28, whose upper end is connected with the clutch control mechanism to be set forth hereinafter. Also shown in Figure 1 is a selector handle 30 for controlling and adapting the clutch mechanism for one stroke or continuous stroke operation of the press as set forth hereinafter, together with a clutch brake mechanism indicated generally by the numeral 32, and whose construction and operation has been fully set forth in my above identified co-pending application.

Referring now more specifically to Figures 3 and 4, it will be seen that the flywheel 22 is provided with a hub portion 34 which is laterally enlarged and which is axially bored to receive the flywheel journaling and the clutch mechanism to be hereinafter set forth.

The two ends of the bore of the hub 34 are enclosed by a pair of hub plates 36 and 38, respectively, which are detachably secured to the hub portion 34, as by cap screws 40 or the like. It may be here noted that the bore of the hub 34 is indicated at 35 in Figure 4.

The hub cap 38 is provided with an inwardly extending annular flange 42 which is received within a counterbored chamber 44 which constitutes an enlargement of the termination of the bore 35. Received within the flange 42 is the outer race 46 of a roller thrust bearing assembly, the inner race 48 of which is carried by a suitable shoulder and race receiving surface of a bearing ring 52 which is rigidly attached to the power shaft 24, as by a key 54, or the like. The flanges 42 of the hub cap 38 and of the bearing ring 52 terminate in bearing race receiving shoulders 55 and 53, respectively, which serve to retain the bearings in proper position in the counterbores 44.

At the other side of the bearing hub, the bearing cap 36 is likewise provided with an annular, inwardly extending flange 42 which is received within a corresponding counterbore 44 in the bore 45. Similarly, an outer bearing race 48 is abutted against a shoulder 55 carried by the flange 42, and supports, as by means of a roller thrust bearing assembly 50, the inner bearing race 48 which is abutted against a shoulder 53 carried by the bearing seat 56 which is keyed upon the end of the power shaft 24, as at 58. Retained between a shoulder on the internal surface of the bearing seat 56 is an annular cam ring 60 whose purpose will be set forth hereinafter. It will thus be seen that the hub 34 of the flywheel 22 is retained and rotatably journaled upon the end of the power shaft 24 by means of the thrust bearing assemblies, the bearing rings, the hub cap construction and the keys.

Removably but non-rotatably retained in the bore 35 is a cylindrical bushing or disk 64 constituting the female element of the clutch, and comprising a clutch contact bushing.

As will be more readily apparent from Figure 3 and 4, the power shaft 24, constituting and referred to hereinafter as the driven shaft or driven member of the clutch, is provided with a longitudinally extending, arcuately shaped recess 66 constituting a key seat for the clutch key 68 which is of the rolling and sliding type.

The member 56 is provided with a preferably integral closure partition 70 and is retained upon the end of the driven shaft 24 as by means of a tubular bolt 72 whose inner extremity is externally screw-threaded for engagement in a bore 74 in the shaft 24. The outer extremity of the tubular bolt 72 is provided with a fitting 76 by means of which grease or oil may be fed through the bolt into the passage 74 and from thence may lubricate the clutch mechanism in any desired manner.

A bore or chamber 78 is formed in the member 56, extending through the head portion 78 thereof, which chamber serves as a clutch spring chamber for housing a clutch key actuating spring 80 of any suitable type or construction, and illustrated as consisting of a coil spring, one end of which is seated upon a spring seat or retainer 82 bearing against the outer extremity of the clutch key 68, while the other end of the spring abuts a suitable seat formed in a screw-threaded adjusting plug 84 extending through the outer end of the cap 70 whereby the plug may be adjusted to vary the spring pressure applied to the clutch key.

Figure 2:
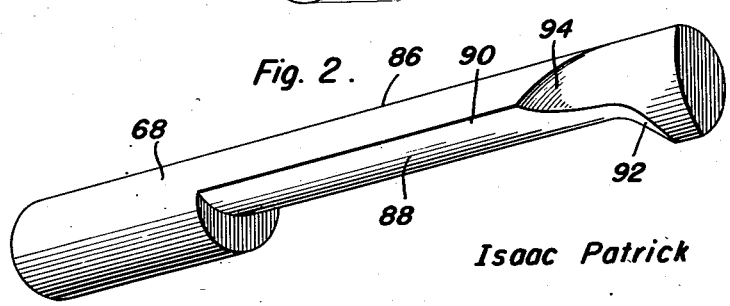
Figure 2 is a perspective view of the improved clutch key of the rolling type which is employed in the clutch mechanism of the device.
Figure 11:
Figure 11 is a top plan view of the clutch latch plate slide forming a part of the clutch control mechanism.

For a better understanding of the construction of the clutch key, attention is now directed to Figures 2 and 3, wherein it will be seen that the clutch key 68 is provided with a major portion 86 intermediate its ends which constitutes the driving or engaging portion of the clutch key. As illustrated, the clutch key is of circular cross section at its extremities, but at its major portion 86 is reduced or recessed to provide a convex surface 88, which merges with the outer or normal surface of the cylindrical clutch key to provide a pair of nose portions 90.

It may be here noted that the curvature of the external surface of the key 68 corresponds to the radius of curvature of the key seat 66, whereby the circular portion of the clutch may be journaled in and rotatable in as well as slidably disposed in the seat 66. The convex surface 88 of the major portion 86 of the key is likewise formed with the same radius of curvature as the circumference of the driven shaft 24, whereby, when the parts are disposed in the position shown in Figures 3 and 7, the convex surface 88 forms a continuation of the periphery of the driven shaft, whereby the shaft and the key embedded therein are free to rotate without engaging the surrounding clutch driving member 64.

It is essential that the length of the convex surface 88 and of the mid portion 86 of the clutch shall be greater than the width of the clutch member 64, whereby the key may be slid longitudinally of its seat 66 through the bore of the clutch member through which the shaft 24 extends. At its outer extremity, that is, outwardly of the hub 22 and of the press body 10, the convex surface 88 of the clutch key merges, by means of a smoothly extending cam surface 92, into the unbroken, circular end portion of the key, this cam surface 92 constituting the key engaging cam surface for causing rotation of the cam in its seat as the cam is slid longitudinally in the seat 66 by a means to be later set forth.

Disposed and in appropriate angular relation with respect to the key engaging cam surface 92 is a key releasing cam surface 94 which is adapted to rotate the key into its fully recessed position in the key recess as the key is moved or slid longitudinally in the groove by the releasing mechanism to be later set forth.

The means for causing the rotation of the clutch key by means of its longitudinal sliding movement is the cam ring 60 which is rigidly secured as by a friction fit in the bearing seating sleeve 56 and in slightly spaced relation to the hub portion 64. This cam ring 60 has an axial bore which registers with the bore of the clutch member 64, and which bore is provided with rounded edges to cause smooth and easy actuation of the clutch key. As will be best seen by reference to Figure 3, as the clutch key is slid longitudinally through the cam ring 60, the cam engaging surface 92 cooperates with the rounded edges of the cam ring 60 to cause a rotation of the clutch key in the seat 66, thereby moving the clutch key nose 90 from the inoperative position shown in Figure 7 to the fully engaged position shown in Figures 4 and 10.

In this fully engaged position, the nose is extended radially from the driven shaft 24 into snug and tight engagement in the key recesses 93, a plurality of which are formed in the inner circumference of the driving bearing member 64. It will be noted that these recesses 93 are provided with arcuately shaped walls whose curvature corresponds to that of the clutch key convex surface 88 and the circular outer surface of the clutch key.

As will readily be understood, the spring 80 constantly urges or biases the clutch key for longitudinal movement in the recess 66, and in response to this longitudinal movement the cam surface 92 engages the cam ring 60 and causes the rotation of the clutch key, as set forth hereinbefore, thereby radially extending the key nose 90 into the above mentioned clutch-engaging position in the chamber 93 of the clutch driving member 64.

When the clutch key 68 is moved longitudinally in its seat 66 in the reverse direction, in opposition to the pressure of the spring 80, the cam release surface 94 of the clutch key engages the other edge of the cam ring 60, and by means of the curvature of this cam surface causes a reverse rotation of the key until the latter is retracted from its radially extended position into the fully seated position. Thus, the clutch is selectively radially advanced or radially retracted into engaged or released position by means of the longitudinal movement of the clutch key in its key recess in the driven shaft.

Attention is now directed to the mechanism for causing the releasing or retracting movement of the clutch key against the biasing action of the clutch spring. For this purpose, what may be termed the inward extremity of a clutch key is provided with an axial extending, arcuate, cam portion 98, and with a cut-away portion 96. These members cooperate with camming surfaces on a latch plate slide, in a manner to be hereinafter set forth, whereby rotation of the driven shaft 24 and of the key 68 carried therein, by engagement of the camming surface with the latch plate slide, causes inward movement of the clutch key and slides the latter in its recess, against the opposition of its clutch spring, as set forth hereinbefore.

Figure 13:
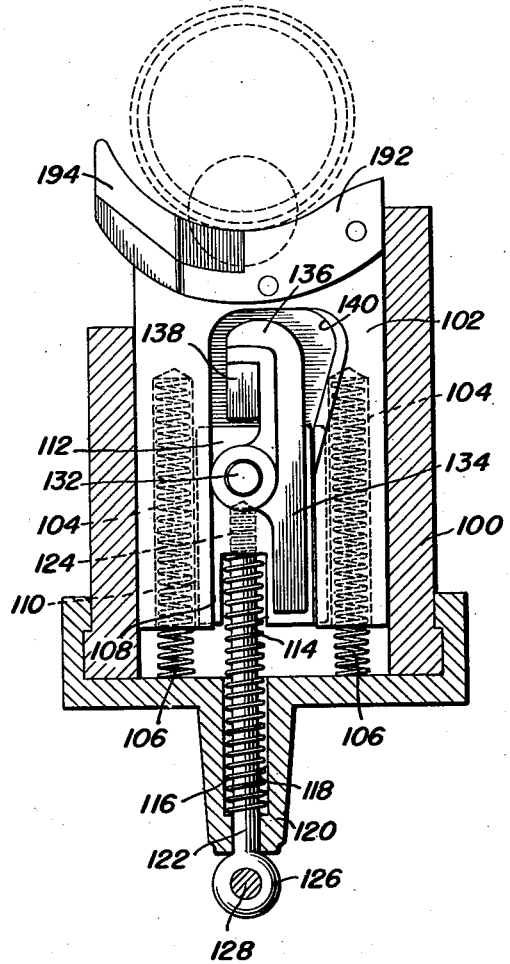
Figure 13 is a vertical longitudinal sectional view through the latch mechanism.
Figure 14:
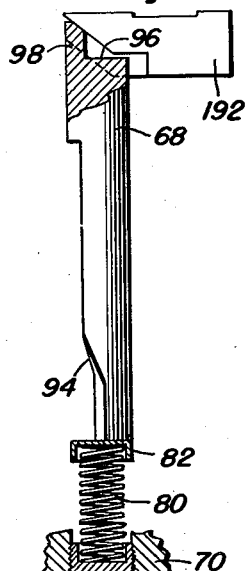
Figure 14 is a diagrammatic top plan view illustrating the engagement of the latch mechanism with the clutch key at the commencement of the clutch-releasing movement.
Figure 15:
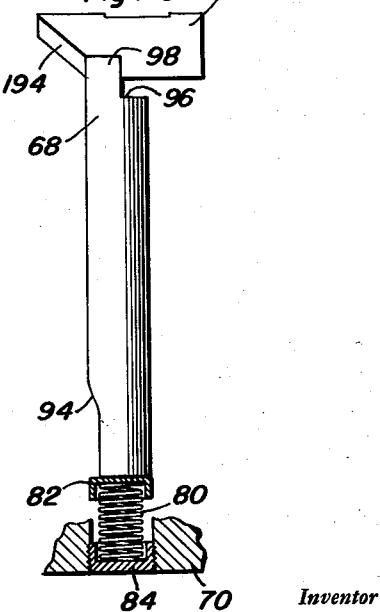
Figure 15 is a view similar to Figure 14 but showing the clutch key in its fully released and inoperative position.

Suitably mounted upon the body of the press, in any desired manner, not shown, is a latch plate slide holder and guide indicated by the numeral 100 in Figure 13. The holder 100 is mounted in alignment with, but below the driven shaft 24, and between the body 10 and the flywheel 22. Guided in this holder for vertical sliding movement therein is a latch plate slide 102, which comprises a generally rectangular block, whose lower end is provided with a pair of parallel bores 104, within which are received coil springs 106 whose lower extremities abut against the bottom surface of the holder 100. These springs normally urge the latch plate slide into its uppermost position, unless opposed in their operation by mechanism to be set forth hereinafter, and are effected to position the latch plate slide into position for engagement by the camming surface 98 on the clutch key 68.

Opening from its lower end, the latch plate slide is provided with an axially disposed guideway 108, having a laterally enlarged guideway surface 110, which surfaces 108 and 110 slidingly receive a latch slide 112 for vertical and axial movement in the latch plate slide.

Figure 12:
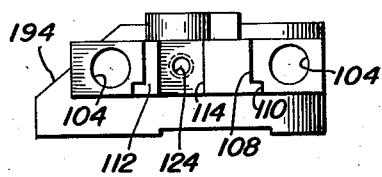
Figure 12 is a bottom plan view of the latch plate slide and the latch slide of the latching mechanism.

As will be apparent by reference to Figures 12 and 13, the latch slide 112 has a downwardly opening bore 114 therein, which receives the latch slide spring 116, whose other end is received in a socket or bore 118 formed in the base of the latch plate slide holder 100, in an extension or socket 120 thereof.

A connecting rod 122 has its upper extremity screw threadedly engaged, as at 124, in the bottom of the bore 114, and extends through the spring 116 and through the boss or socket 120, having an eye portion 126 at its lower end for engagement by a pivot pin 128 for a purpose to be later set forth.

Carried by a fulcrum pin 132 extending from the latch slide 112 is a latch 134, having a latch hook 136 at its upper end, which hook is engageable and removable from overlying position with respect to a laterally extending keeper or lug 138 carried by the latch plate slide 102.

As shown in Figure 13, the bore 108, in which is slidingly received the latch slide 112, is laterally enlarged at its upper end, as at 140, to provide a working clearance to permit oscillation of the latch 134 about its pivot 132, as set forth hereinafter, in order that the latch hook 136 may be withdrawn from the latch keeper 138.

The operation of this latch plate slide and latch slide is as follows. The latch plate slide is normally urged to its uppermost position, into clutch key engaging position, by means of the latch plate slide springs 106. However, the latch plate slide is maintained in retracted position, by means of the downward pull exerted on the latch rod 122 through the pivot 128, which latch rod exerts a downward pressure upon the latch slide 112, overcoming the resistance of its spring 116, and by reason of the engagement of the latch finger 136 over the keeper 138 carried by the latch plate slide, maintains the latter in lowered position. When, now, the downward pressure exerted by the pivot 128 is released, the combined resilience of the springs 116 and 106 serves to urge the latch plate slide 102 and the latch slide 112 and the latch 134 still in latching position, to the above mentioned uppermost position of the latch plate slide.

However, even though the downward force exerted on the latch rod 122 by the pivot pin 128 is not released, and the slide 112 is still in its lowermost position, it will be understood that when the latch 134 is oscillated about its pivot 132, the latch finger 136 will be withdrawn, this withdrawing movement being permitted by means of the clearance in the enlarged portion 140 of the slot 108. When the latch hook 136 is then withdrawn, even though the latch slide 112 is in its lower position, the latch plate slide springs 106 are released and are permitted to elevate the latch plate slide into its raised position whereby the latch plate slide is positioned for engagement by the clutch key.

Attention is now directed more particularly to Figures 5 and 8, wherein it will be seen that the pivot pin 128 of the latch rod 122 is carried by one extremity of the latch plate slide operating lever 142, which, intermediate its ends, is pivoted, as at 144, to any suitable part of the body 10 of the press. The clutch control rod 28 is pivotally connected with the lever 142, as by a pivot pin 146, and if desired any suitable type of adjusting connection may be provided at this point. At its outer extremity, beyond the fulcrum pin 144, the lever 142 is provided with a spring mechanism for yieldingly urging the operating rod 28, the lever 142, and the latch rod 122 into their raised position. By means of a suitable pivot pin or fulcrum 148 carried by the press body 10, and the encircling eye portion 150 of a bolt 152 which is screw-threaded at its outer extremity, as at 154, and is provided with adjusting nuts 156, a spring 158 positioned between said nuts and the end of the lever 142 serves to adjustably bias the lever to its raised position.

As will be readily understood, when the lever 142, the control rod 28, the latch rod 122 and the latch plate slide 102 are in their raised position, the latter is positioned for moving the clutch key to its released position.

As will be readily apparent from Figures 5 and 8, a latch spring 160 is terminally secured to the latch 134 adjacent its lower end, and to any suitable portion of the press body 10, for yieldingly urging the latch into its engaging position with the keeper 138.

As so far described, it will be readily appreciated that when the treadle 26 is depressed, the control rod 28 will be lowered, the lever 142 will be moved downwardly, and the latch plate slide 102 will be withdrawn from its engagement with the end of the clutch key, thereby releasing the latter and permitting the clutch key spring 80 to slide the key longitudinally in its seat, to cause the above mentioned rotating action of the key, and radially extrude or extend the cam nose 90 of the key into driving engagement with the key seat 93 of the driving member 64, whereby the continuously rotating flywheel 22, and clutch driving member 64 will cause rotation of the driven shaft 24 of the press. It will be readily understood that as long as the latch plate slide is in its lowered or retracted position, as shown in Figures 8 and 9, the key will remain in its engaged position, as shown in Figures 4 and 10, and the continuously rotating flywheel will continuously operate the press. If, now, the treadle is released, the spring 158 will return the slide to its upper position, thereby causing the latch plate slide to disengage the clutch key and force the latter into its inoperative position. It will also be apparent that even though the control pedal 26 is depressed and the slide is in its lowered position, operation of the latch 134 to disengage its latch hook 136 from the keeper 138 will permit the latch plate slide to again rise into clutch-releasing position.

Means are provided for automatically causing the clutch to disengage itself after one revolution of the driven shaft; and a selector means is provided for manually rendering the one revolution, clutch throwout means operative or inoperative at will. This one stroke clutch throwout mechanism includes a one stroke latch in the form of a slide plate 162 which is slidingly received in a suitable guide in a body member 164, and is provided with springs 166 normally urging the latch 162 outwardly of its guide bore. This body 164 is mounted upon the press body 10, as by fastening bolts 168, in any suitable manner. At its outer end, the one stroke latch 162 is provided with a cam surface 170 which is suitably curved and shaped for engagement by the clutch key 68 as the latter, during the rotation of the driven shaft 24, leaves the latch plate slide 102, the angular spacing between these two slides being of any desired magnitude, such, for example, as 90° as shown in Figures 5 and 8. Pivoted to the one stroke latch slide 162, as by a pivot pin 172, is a trigger operating lever 174 fulcrumed, as at 176, to the body 164, which lever is pivotally connected, as at 178, at its lower extremity with a trigger block 180. The body 164 is provided with a suitable stop screw 190, which may be adjusted to engage the lever 174, and limit the inward movement of the one stroke slide 162, to thereby prevent the cam 170 thereof from rubbing against the surface of the driven shaft 24, while properly positioning the cam for easy engagement by the clutch key 68.

A trigger pin 182 is adjustably screw threaded into and carried by the trigger block 180, and is maintained in adjusted relation with respect thereto, as by a lock nut 184. This trigger pin extends laterally from the trigger block 180, as shown in Figures 5 and 8, into a position adjacent to the latch 134, whereby, when the slide 162 is operated by the clutch key when the latter is in the position shown in Figure 5, the slide will be moved inward, the lever 174 will be oscillated, and the trigger body 180 and the trigger pin 182 carried thereby will be forced against the lower end of the latch 134, causing pivoting movement of the latter about its pivot pin 132, and releasing the hook 136 from the keeper 138, to thereby permit the latch plate slide 102 to be raised to clutch-release position, by means of its springs 106.

However, it will be readily understood that when the trigger body 180 is pivoted about its pivot pin 178 from the position shown in Figure 5 to that shown in Figure 8, the resultant movement of the trigger pin by the one stroke latch slide 162 will be ineffective to contact the latch and release the latter. Accordingly, when in the position shown in Figure 8, the latch will still engage the retainer 138 and thereby will hold the latch plate slide in its retracted position whereby the driven shaft may continue to be operated by the clutch and the press will continuously operate, until such time as the treadle and control rod 28 are released, or the trigger block 180 is returned to the position shown in Figure 5.

In order to selectively control the trigger block to position the trigger for the single stroke operation shown in Figure 5, or the continuous operation of the clutch as shown in Figure 8, the above mentioned handle 30 is provided which is rigidly attached to the block 180, and serves as a means to pivot the same. In order to enable the handle and the block to be retained in the desired position, a pair of flanged supports 186 and 188 are provided and carried by the body 100 for selectively receiving the selector handle 30 in the one stroke or the continuous stroke positions respectively.

It should be particularly noted that by manipulating the handle 30 and positioning the same upon the appropriate support 186 or 188, the device may be selectively positioned, during operation of the press, for adapting the control mechanism to one stroke or continuous stroke operation.

Adjustably positioned in a lug on the trigger block 180 is an adjusting screw 190 which is adapted to limit the downward pivotal movement of the handle 30 and of the trigger block 180 about the pivot pin 178, this screw being engageable with the lever 174 after a predetermined downward movement of the block and handle.

It is further to be noted that the selector handle 30 and the block 180 are preferably connected to the lever 174 by a swivelling type of pivot 178, whereby the handle 30 and block 180 may have a slight lateral movement to enable the handle to be engaged over or removed from the flanges of the supports 186 and 188. Of course, as the lever 174 is oscillated, the block 180 and the handle 30 are reciprocated, which reciprocatory movement is permitted by the sliding engagement of the handle upon the supports. When, however, the handle 30 is positioned on support 188, see Figure 8, the lever 174 is moved in a clockwise direction and is held rigidly in position, this holding the cam 170 clear of the clutch pin 68, so that there is no movement of any of the parts 170, 162, 172, 174, 180, 182 and 30.

Reference is now made specifically to Figures 11–15, and in addition to Figures 6 and 9 for an explanation of the engaging cam surfaces of the latch slide plate and the clutch key. Integrally or otherwise carried by the upper portion of the latch slide plate 102 is a cam head 192. The upper surface of this cam head is arcuate, to provide clearance for the driven shaft 24, and its lateral surface adjacent the clutch key is provided with a tapering cam surface 194. This surface is adapted to register with the cam surface on the cam member 98 at the end of the clutch key 68. Accordingly, when the latch plate 102 is in its raised position, and the driven shaft 24 with the clutch key 68 in its engaged position is rotating, the cam extension 98 on the key engages the outer portion of the arcuate cam surface 194, and in moving thereover is forced inwardly and rotated in its key seat 66, until at or prior to the termination of the travel of the key on the cam surface 194, the key is in its completely recessed or inoperative position.

From the foregoing, it is believed that the operation of the clutch controlling mechanism will be readily understood. With the press in its idle position, in order to operate the same, the flywheel 22 is first set in motion from any suitable power source, and this flywheel is intended to continue operating, with its hub and the clutch member 64 therein constituting the clutch driving member, which is operatively placed in driving engagement with the clutch driven member, the shaft 24, by means of the clutch key. With the flywheel rotating, the treadle 26 is depressed, thereby causing the latch plate 112 to be retracted which, through the latch 134 and keeper 138, causes the withdrawal of the latch plate slide from the position shown in Figure 13, which is the idle position of the clutch mechanism, to the position shown in Figure 8. At this time, regardless of the position of the selector handle 30, whether positioned for single stroke or continuous stroke operation, the cam surface 194 has now been withdrawn from the cam surface 98 of the clutch key 68, whereby the latter is now slid longitudinally in the seat 68 by the action of the spring 80. As hereinbefore pointed out, this sliding movement causes the key to rotate, thereby establishing a driving engagement between the driving and driven members, whereupon the shaft 24 is placed in rotation, this rotation, of course, operating the press. After about a quarter of a revolution of this shaft 24, the parts have moved from the position shown in Figure 13 to the position shown in Figure 8, at which time the clutch key engages the cam surface 170 on the single stroke latch plate 162, thereby depressing the latter against its springs 166, causing reciprocation of the lever 174 and causing actuation of the trigger pin 182. If the trigger pin is in the position shown in Figure 8, as for continuous stroke operation of the press, the trigger is ineffective, the latch 134 is not released thereby, the latch slide plate 102 therefore remains retracted, and the clutch remains engaged and the press continues operating for as long as the treadle 26 is depressed. If, however, the selector handle is in the position shown in Figure 5, the trigger, instead of being ineffective, now engages the latch 134, and as set forth hereinbefore, releases the latch permitting the latch plate slide springs to elevate the latch and position the latter in its uppermost position, whereupon the cam surface 194 is again disposed in the path of travel of the cam surface 98 of the clutch key. When the clutch key and the shaft 24 complete their revolution, the clutch is again rendered inoperative, as set forth hereinbefore.

With the press operating in the continuous stroke position of the selector, it is merely necessary to raise the selector handle to the one stroke position, which may be done while the press is in operation, after which, upon the next engagement of the clutch key with the cam 170 of the one stroke latch, the trigger is rendered effective to release the latch, whereupon, upon the completion of that revolution, the cam surfaces 98 and 194 cause the clutch to be disengaged.

With the press operating in the one stroke position, after the one stroke latch has operated the trigger to disengage the clutch and the clutch is released, it is merely necessary to release the treadle, whereupon the spring 158 will serve to raise the rod 28, the lever 142, the latch rod 122, the latch slide 112, and the latch 134, until the latch hook 136 is again snapped over the retainer 138 by means of the spring 160. The treadle may then be depressed, the latch withdrawn, and the press will again operate for one stroke.

Although the key has been shown as mounted in the power shaft with the clutch driving member in the flywheel, it will be readily apparent that this arrangement may be reversed if desired.

From the foregoing, the manner of operating the device, its construction and manifest advantages will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having disclosed and described the invention, what is claimed as new is:

1. In an inclinable press, a clutch comprising rotatable driving and driven members, a clutch key carried by one of said members and movable into driving engagement with the other member, actuating means for moving said key into driving engagement, release means for moving said key into inoperative position, said release means including a cam having a cut-away portion in cooperation with a latch plate slide whereby rotation of said driven member and of said clutch key by engagement of said cam with the latch plate slide cause movement of the clutch key and slides said clutch key out of driving engagement, manually operable selector means for conditioning said release means for selective single or continuous rotation of the driven member and clutch control means for selectively rendering said actuating and release means operable and inoperable.

2. The combination of claim 1 wherein said cam means includes a first cam surface on said key, a latch and a second cam surface on said latch, said cam surfaces being engageable to cause longitudinal movement of said key.

3. The combination of claim 2 including a manually operable means for selectively moving said latch and said first cam surface into and out of position for engagement by said second cam surface.

4. A clutch control mechanism for an inclinable press having a power shaft and a relatively rotatable driving member coaxial with said shaft, comprising a female clutch member fixed to said driving member, a key recess in said one of said members, a clutch key in said recess retractible into and extensible beyond the circumference of said shaft for respectively releasing and establishing a driving engagement with said female member, means for moving said key longitudinally of said recess, said means comprising a resilient spring member for yieldingly urging said key towards one end of its longitudinal movement, and cam means positively moving said key against the opposition of said resilient spring member, said cam means forming the engaging surface of a latch plate slide, said slide being carried by a latch plate slide holder, said holder being mounted in alignment with and below said shaft, said slide comprising a substantially rectangular block, the lower end of said slide being provided with a pair of parallel apertures, a pair of resilient members received in said apertures and abutting against the bottom inner surface of said holder and adapted to urge said slide into its uppermost position, said slide also having a downwardly centrally located threaded aperture, said holder having an apertured socket in alignment with said central aperture in said slide, a latch slide spring received in said socket and extending into said central aperture in said slide, said slide carrying both a latch having a hooked end and a laterally extending lug, said hooked end being engageable and removable from an overlying position with respect to said lug, a connecting rod in threaded attachment with said central aperture and extending through said apertured socket and secured to manually operable means for actuating said connecting rod to selectively move the cam surface on said slide into and out of position for engagement with the cam surface on said clutch key, and further means for causing retraction and extension of said key in response to longitudinal movement.

5. The structure of claim 4 including trigger means for selectively setting the press for single or continuous operation.

6. The structure of claim 5 wherein said clutch key comprises a recessed portion intermediate its cylindrical ends which constitutes the driving portion of said clutch key, said recessed portion being formed by a concave surface merging with the otherwise cylindrical surface of the clutch key to form a pair of nose portions, the radius of said convex surface being determined by the center of rotation of said power shaft.

7. In a clutch control mechanism for an inclinable press, means for longitudinally moving a clutch key, said means comprising a cam surface on a latch plate slide adapted to engage another cam surface on the clutch key, said slide being carried by a latch plate slide holder, said holder being mounted in alignment with and below said shaft, said slide comprising a substantially rectangular block, the lower end of said slide being provided with a pair of parallel apertures, a pair of resilient members received in said apertures and abutting against the bottom inner surface of said holder and adapted to urge said slide into its uppermost position, said slide also having a downwardly centrally located threaded aperture, said holder having an apertured socket in alignment with said central aperture in said slide, a latch slide spring received in said socket and extending into said central aperture in said slide, said slide carrying both a latch having a hooked end and laterally extending lug, said hooked end being engageable and removable from overlying position with respect to said lug, a connecting rod in threaded attachment with said central aperture and extending through said apertured socket and secured to manually operable means for actuating said connecting rod to selectively move the cam surface on said slide into and out of position for engagement with the cam surfaces on said clutch key.

ISAAC PATRICK.

REFERENCES CITED

The following references are of record in the file of this patent:

UNITED STATES PATENTS

| Number | Name | Date |
| --- | --- | --- |
| 1,158,370 | Campbell | Oct. 26, 1915 |
| 1,200,042 | Sperry | Oct. 3, 1916 |
| 2,396,427 | Johansen et al. | Mar. 12, 1946 |